(No Model.)
J. S. SELLON.
SECONDARY BATTERY.
No. 377,642. Patented Feb. 7, 1888.
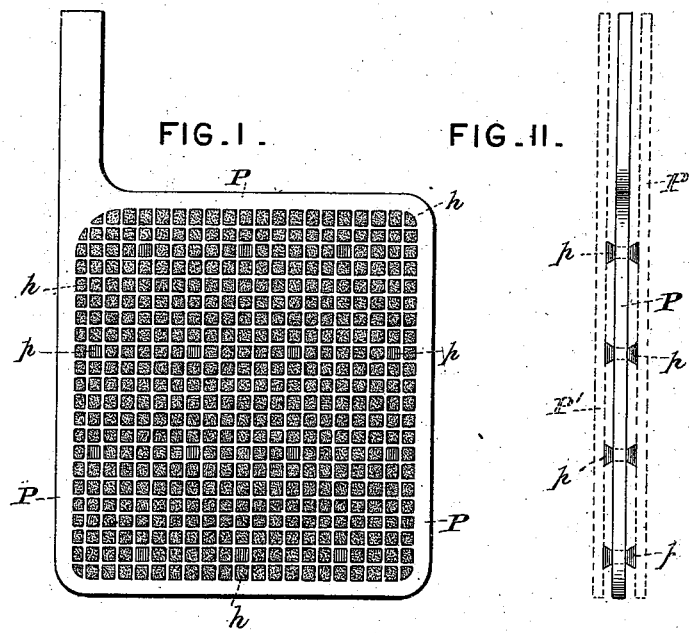
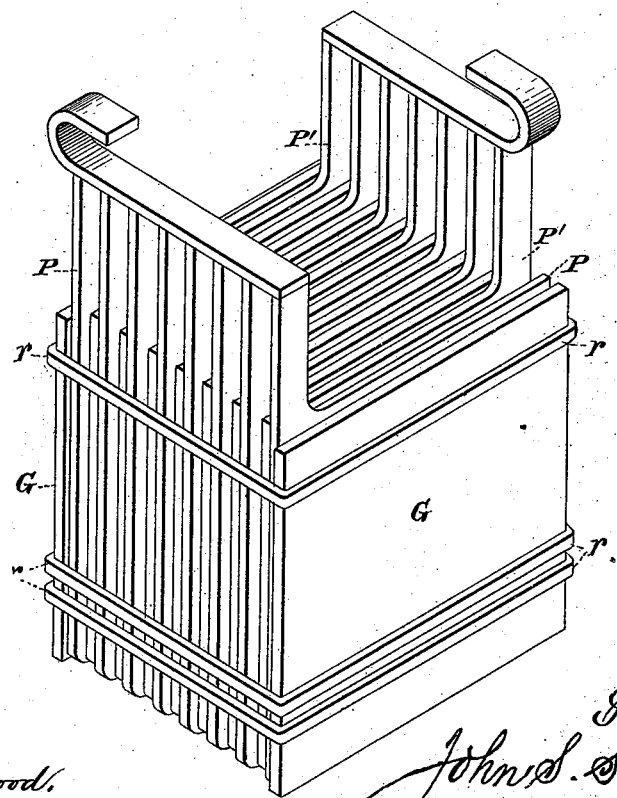
Attest:
Geo. T. Smallwood.
Philip Mauro
Inventor:
John S. Sellon by
A. Pollok
his attorney.

UNITED STATES PATENT OFFICE.

JOHN S. SELLON, OF HATTON GARDENS, COUNTY OF MIDDLESEX, ENGLAND, ASSIGNOR TO THE ELECTRICAL ACCUMULATOR COMPANY, OF NEW YORK.

SECONDARY BATTERY.

SPECIFICATION forming part of Letters Patent No. 377,642, dated February 7, 1888.

Application filed April 19, 1887. Serial No. 235,424. (No model.) Patented in England December 14, 1883, No. 5,741.

*To all whom it may concern:*

Be it known that I, JOHN SCUDAMORE SELLON, a subject of the Queen of Great Britain and Ireland, resident at Hatton Gardens, in the county of Middlesex, England, have invented certain new and useful Improvements in Secondary Batteries, (for which I have obtained a patent in Great Britain, No. 5,741, dated December 14, 1883,) of which the following is a specification.

My invention consists in an improved arrangement of the plates or elements of a secondary battery.

The object is to preserve a uniform distance between any two plates, to secure the series of plates together as firmly and compactly as possible while allowing for the expansion, contraction, and movement incident to use and transportation, and to secure the minimum internal resistance and weight.

My invention is well adapted to use with a series of perforated lead plates having an active material located or packed in the perforations. In manufacturing these plates an oxide of lead is applied to the perforations in the plates, and the oxide is then removed from a number of the holes, and sections of rubber or other suitable insulating material inserted in the vacant holes. It is important that the active material be applied to the plates before the plugs are driven into position, as the divisions between the perforations would otherwise be deformed or broken. The length of these sections must be slightly greater than the thickness of the lead plate, so that the sections or plugs project a short distance on both sides of the plates. A form of secondary cell in very general use consists of eight positive plates and seven negative plates, perforated, and about eight by eight inches area. In this case I remove the oxide of lead from the holes in the positive plates in three or four horizontal lines and drive in the plugs or sections, which must be slightly greater in cross-section than the size of the holes, so that considerable force is required to place them in position. In case plugs are placed in both positive and negative plates, care must be exercised not to have the plugs of any two successive plates coincident. I prefer to plug only the positives, for as the plugs project on both sides, and as every negative is between two positives, there is no contact possible. The next step after plugging the plates is to arrange them in alternate succession between two plates of glass, hard rubber, or other suitable mechanically strong insulating material and to unite the whole pile by bands of sufficient strength to enable it to stand up.

Referring to the accompanying drawings, Figure I shows the plate with plugs in position. Fig. II is an edge view showing the adjoining plates in position. Fig. III shows the pile of plates assembled with side plates of insulating material, the whole held together by bands.

The plate P is preferably of lead, having a series of perforations, $h$. I take this plate and fill the perforations with a paste of lead oxide, and after the paste is in position I clear a series of the holes and drive in a series of india-rubber or other suitable plugs, as $p$. It is desirable to have the paste in position when the plugs are driven in, as it strengthens the divisions and avoids breaking or bending the plate or support. The plugs must project a short distance from the opposite surfaces of the plates. As shown in Fig. III, there are eight positives and seven negatives. I prefer to plug only the positives. In this way there is a plugged positive on both sides of every negative, the result being as shown in Fig. II, where P is the plugged positive plate and P' the unplugged negatives. Before placing in the inclosing-cell the plates are arranged in alternate order, as shown in Fig. III, and the two side plates of insulating material, preferably of glass, G, are placed upon opposite sides of the assembled plates, the whole united by bands $r$ of insulating material.

What I claim, and desire to secure by Letters Patent, is—

1. In a secondary battery, two or more plates, elements, or supports having a series of insulating-plugs extending through and projecting from both surfaces, combined with plates of insulating material held in contact therewith by bands of insulating material.

2. In a secondary battery, a series of plates, elements, or supports having a series of rubber plugs extending therethrough and projecting from their surfaces, combined with two plates of insulating material held in contact therewith by rubber bands, substantially as described.

3. In a secondary battery, a series of perforated positive plates and a series of perforated negative plates interleaved therewith, a series of plugs of insulating material extending through and projecting from both surfaces of one series of plates, active material filling the other perforations of said plates, plates of insulating material upon opposite sides of the series of battery-plates, and bands of insulating material uniting the whole, substantially as described.

In testimony whereof I have signed my name to this specification in the presence of two subscribing witnesses.

JOHN S. SELLON.

Witnesses:
S. C. TAUSEN,
RUDOLPH THOS. NICKOL.
*Both of 9 Birchin Lane, London, E. C.*